(No Model.)
H. H. FRANCIS.
ARTIFICIAL STEM FOR CUT FLOWERS.
No. 501,134. Patented July 11, 1893.
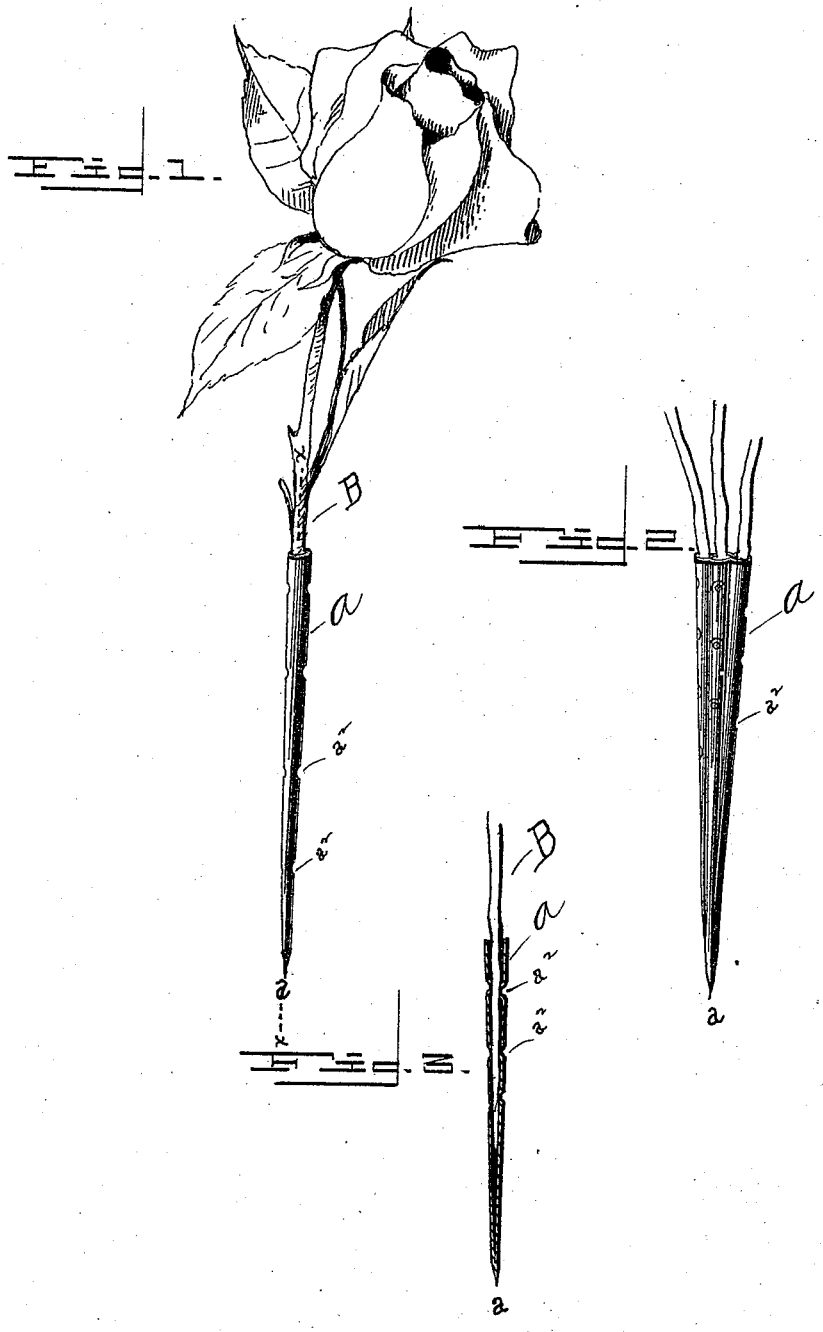
WITNESSES:
James L. White
Bertram F. Thornett
INVENTOR
Harry H. Francis
BY
Evert & Appleman
ATTORNEYS.

UNITED STATES PATENT OFFICE.

HARRY H. FRANCIS, OF MADISON, NEW JERSEY.

ARTIFICIAL STEM FOR CUT FLOWERS.

SPECIFICATION forming part of Letters Patent No. 501,134, dated July 11, 1893.

Application filed January 3, 1893. Serial No. 457,149. (No model.)

*To all whom it may concern:*

Be it known that I, HARRY H. FRANCIS, a citizen of the United States of America, residing at Madison, in the county of Morris and State of New Jersey, have invented certain new and useful Improvements in Artificial Stems for Cut Flowers, of which the following is a specification, reference being had therein to the accompanying drawings.

This invention relates to improvements in that class of devices generally known as artificial stems for cut flowers.

The object of the invention is to employ such an improved construction that the usual resistance offered by the stems when being inserted in the ground work or filling of a basket or the like, shall be entirely overcome.

A further object is to construct the said holder so that all wiring, using of tooth picks, &c., shall be done away with, thus decreasing the labor necessary to the ordinary preparation of flowers.

A further object is to provide suitable means in a holder, whereby the stems shall be supplied with sufficient moisture to preserve the life of the flower.

Finally the object of the invention resides in the provision of a cut flower holder that shall be simple in construction, strong, durable and comparatively inexpensive of manufacture.

With these objects in view, the invention consists in various novel details of construction, combinations and arrangements of parts to be hereinafter more fully described and claimed.

In describing the invention in detail, reference is had to the accompanying drawings forming part of this specification wherein—

Figure 1 is a view in perspective of one form of device embodying my improvements. Fig. 2 is a similar view, showing several stems secured in a single holder, and Fig. 3 is a view in vertical section on the line $x$, $x$, of Fig. 1.

In the drawings:—A, represents a tubular body formed of thin sheet steel or other suitable material tapering toward its lower end to form the point $a$. This tube is adapted for the reception of a flower stem B, which latter, after being inserted is held therein by the projections $a^2$, $a^2$. These projections being formed by indenting from the exterior, serve the dual purpose of securely retaining the stems in position and forming a passage or ingress for the moisture contained in the ground work of a flower piece.

The advantages of this device result from its simplicity of construction and efficiency in operation and from the great saving of time and labor usually required in the preparation or stemming of flowers; furthermore, owing to the peculiar form employed, the liability of breaking the stems, &c., is entirely overcome.

It will be particularly noted that various changes may be made in the detail construction without materially departing from the general idea involved.

Having fully described my invention, what I claim as new, and desire to secure by Letters Patent, is—

1. An artificial stem for cut flowers having a tubular body tapering to form a hollow point, and provided with a series of indented perforations as specified.

2. An artificial stem for cut flowers, having a tubular body tapering to a point and the indented perforations formed therein, as specified.

3. An artificial stem for cut flowers, having a tubular and tapering body having indented perforations formed therein, as specified.

4. In an artificial stem for cut flowers, a tubular body tapering to form a hollow pointed end, as specified.

In testimony whereof I affix my signature in presence of two witnesses.

HARRY H. FRANCIS.

Witnesses:
WILLIAM D. GREER,
J. P. NOLAN.